Dec. 20, 1927.  
R. J. RIXDORFF  
1,653,587  
APPARATUS FOR APPLYING PASTE TO BATTERY GRIDS  
Filed June 9, 1926  
2 Sheets-Sheet 1
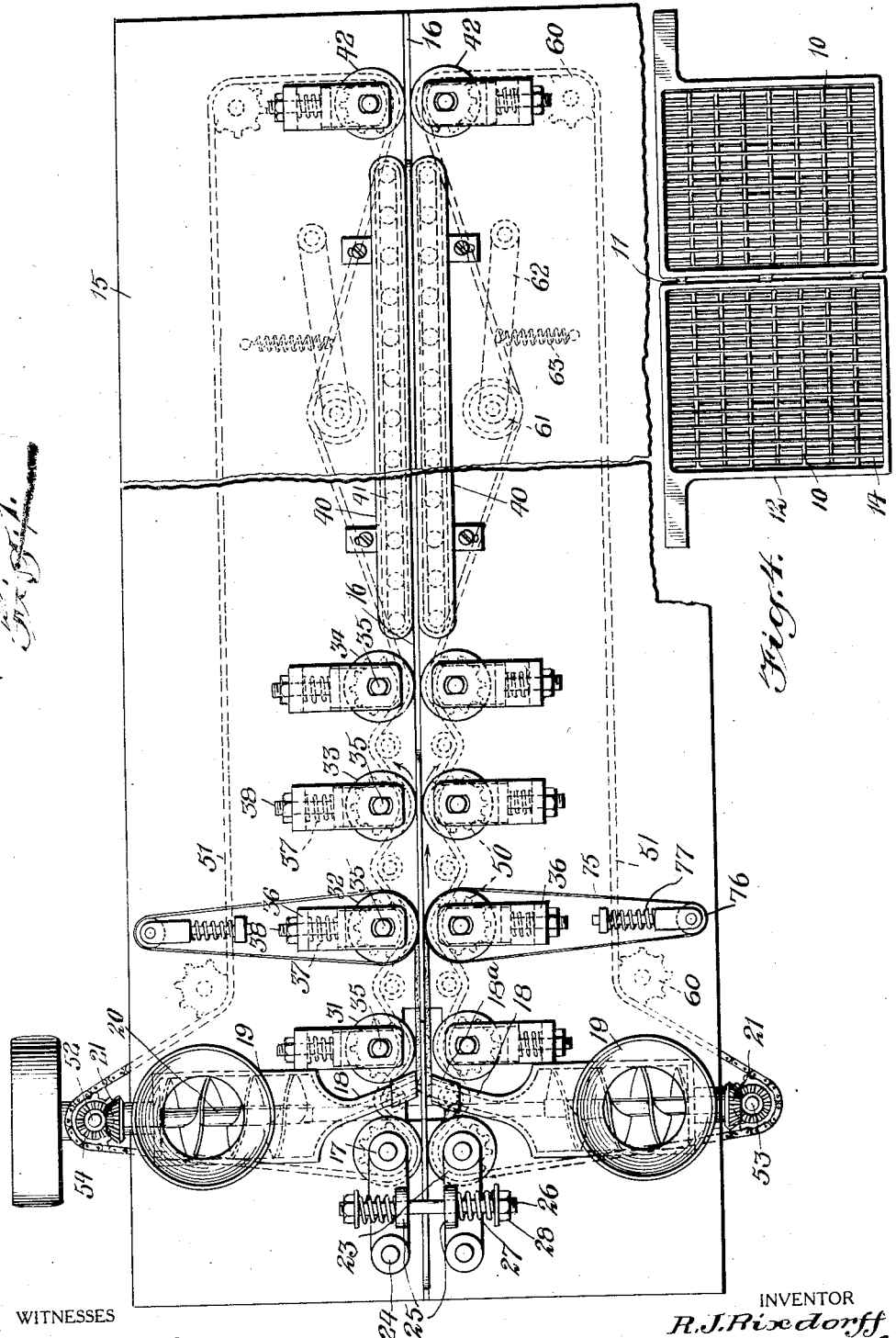
WITNESSES
INVENTOR  
R.J.Rixdorff  
BY  
ATTORNEYS

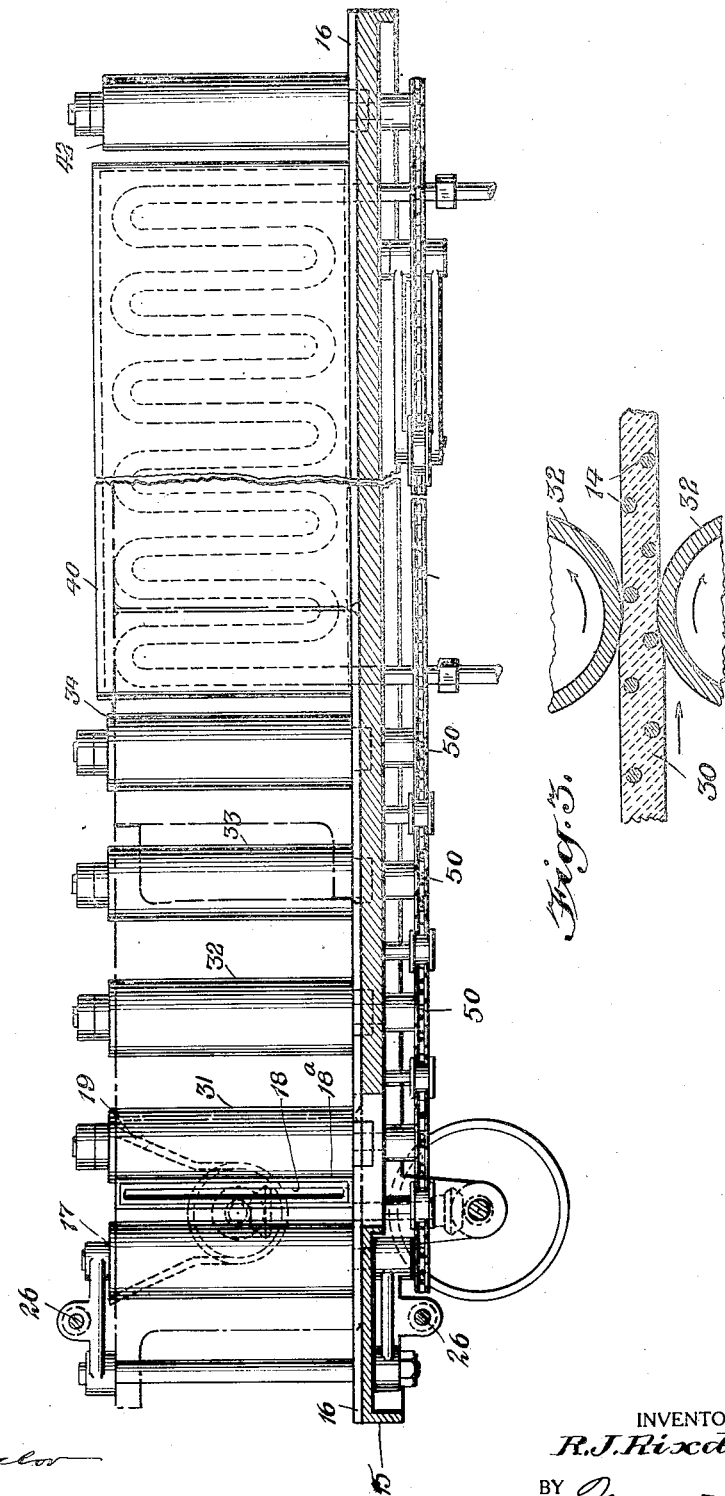

Patented Dec. 20, 1927.

1,653,587

UNITED STATES PATENT OFFICE.

RAGNAR J. RIXDORFF, OF PARIS, FRANCE, ASSIGNOR TO PAUL M. MARKO, OF BROOKLYN, NEW YORK.

APPARATUS FOR APPLYING PASTE TO BATTERY GRIDS.

Application filed June 9, 1926. Serial No. 114,864.

The present invention is concerned with the provision of a machine for automatically applying paste to battery grids, compacting and smoothing the paste, partially or completely drying the paste, and turning out a completed grid with the paste applied and dried.

It has heretofore been customary to apply the paste by hand operation, using a trowel to first place the paste on one side of the grid and then on the other side, and any suitable finishing tools to smooth down and wipe off the excess paste. The hand method is not only expensive, but frequently results in a very imperfect application of the paste, and in some non-uniformity of the grids. In accordance with the present invention these difficulties are eliminated and the operation of applying the paste is greatly expedited.

One object of the invention is to provide an automatic machine for applying the paste and for drying the grids, which will be of simple, practical construction, rugged, durable and efficient in use, and capable of being manufactured and operated with comparative economy.

A further object of the invention is to provide a novel method of applying the paste and drying the plates, the machine constituting one apparatus for carrying out the method.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a broken top plan view of a machine embodying the present invention.

Fig. 2 is a broken side elevational view of the machine.

Fig. 3 is an enlarged transverse sectional detail showing one of the grids passing between a pair of finishing rollers.

Fig. 4 is a view in side elevation of one of the grids to be operated upon.

It is to be noted at the outset that a very simple and elementary form of the machine has been illustrated, certain details of construction and minor refinements being omitted for the sake of clearness.

In the drawings I have used the reference characters 10, 10 to show a pair of integrally connected storage battery grids of conventional construction. These grids are moulded in pairs, being connected by an integral webbing 11 which can be readily broken to separate the grids after the paste applying operation. The particular type of grids illustrated includes generally rectangular frame members 12 connected by transverse cross bars 13 of substantially the same thickness as the thickness of the frame 12. A series of relatively thin vertical bars extend from the top to the bottom of the frame at each side thereof, being integrally connected to the frame and the cross bars 13. One series of bars 14 is staggered relative to the other series, so that there are formed in effect, V-shaped pockets on each face of the grid, adapted for the reception of the paste.

The construction of the pair of skeleton grids above described is well understood in the art, and has merely been discussed here, in order that the nature of one type of grid which may be treated, will be clearly understood. Obviously however, other conventional types of grids might be operated upon by the machine of the present invention, and in accordance with the method of the present invention.

The machine may be supported upon any suitable frame structure (not shown) and includes a bed plate 15 having in its upper face a relatively shallow central groove 16 extending from end to end thereof. This groove receives the lower edge of the pair of skeleton grids 10, and guides the grids in vertical position through the series of forming rolls etc., which are mounted on the base.

A pair of grids being inserted in the groove at the left hand end of the machine, are first grasped by a pair of friction feeding rolls 17 which move the grids along the groove between the discharge nozzles 18 of a pair of paste hoppers 19. These nozzles are equipped with adjustable delivery spouts 18ª to accommodate grids of different thicknesses. The hoppers are detachably secured in any appropriate manner to the base, and in each hopper there is mounted a spiral feed screw 20 which acts to force the paste through the nozzle 18. The projecting ends of the feed screws 20 mount bevel gears 21 which are driven in a manner to be later described.

Feed rolls 17 are spring pressed toward each other, so that they will tightly grip the grid and pass it between the nozzles 18. I have shown one convenient manner of exerting spring tension on the feed rolls, wherein the rolls are provided with trunnions 22 journalled in the ends of swinging levers 23 pivotally mounted on pins 24 secured to the bed. Aligned apertured ears 25 on the levers 23 receive a cross pin 26 encircled by tensioning springs 27, the tension on the springs being regulatable by adjusting nuts 28. Springs 27 thus normally tend to swing the free ends of the arms 23 together and force the feed rolls 17 into contact with each other, or into a position where they will frictionally grip the grids.

As the grids pass between the nozzles of the paste hoppers, the paste extruded from the nozzles is fed uniformly on both faces of the grid, the paste applied being somewhat in excess of that actually necessary, and extending laterally beyond the vertical bars 14, as best indicated in Fig. 3. In this figure, the paste has been given the reference numeral 30.

The paste most commonly used is of a putty-like consistency, consisting of a mixture of red lead, litharge and a suitable chemical binder, such as dilute sulphuric acid.

In order to compact the paste, so that it will fill all of the interstices of the grid plate, and in order to wipe off the excess paste and give the paste a smooth finish, I subject the grids after they have passed the paste applying nozzles, to the action of a series of pairs of finishing rolls 31, 32, 33 and 34. These rolls are mounted on vertical spindles 35 journalled in the bed 15 and having limited lateral shifting movement therein, so that the successive pairs of rolls may be spaced at progressively diminishing distances apart. Frames 36 carried by the bed of the machine mount tensioning springs 37 individually adjustable by nuts 38. The tensioning springs serve to force the rolls of each pair toward each other to cause gripping of the grids as they pass through the series of rolls, and to cause the paste to be gradually forced into the grids during the progress of the grids between the sets of finishing rolls.

Arranged closely adjacent the groove 12 are a pair of compartments 40 for the reception of heating units 41 such as steam coils, or other heating devices. As the grids with the paste applied thereto, leave the last set of forming rolls, they are carried through the heating chamber defined by said compartments and dried so that by the time they reach the last pair of feeding rolls 42, they will be discharged from the machine in substantially finished condition. Either the length of the heating chamber, or the speed of passage of the grids therethrough, may be regulated in order to effect partial drying or complete drying of the paste on the grids as may be desired.

It will be apparent that various means might be resorted to for driving all of the rolls and operating the feed screws of the paste hoppers. For the sake of illustration, I have shown rather diagrammatically an endless sprocket chain drive. The lower depending ends of all of the rolls carry sprocket wheels 50, and the sprocket chain 51 is driven from a vertically disposed drive shaft 52. This shaft, as well as an equivalent counter shaft 53 at the opposite side of the machine carries a bevelled pinion 54 meshing with the pinion 21 of the feed screw 20.

Preferably the drive of the machine is divided into two separate units, one sprocket chain 51 driving one feed screw and all of the rollers on one side of the groove, and another sprocket chain operated from the counter shaft 53 driving the other feed screw and all of the rollers on the other side of the machine. The sprocket chains in their course of passage over the successive sprocket wheels 50 may be led over any suitable number of idler sprockets 60, and over tensioning sprockets 61 carried by the free ends of arms 62 acted on by springs 63 to tension the sprocket chains.

The action of the first pair of rolls serves to contact the paste and to bring excess moisture in the paste to the surface thereof. I may therefore find it desirable to use a pair of moisture absorbent belts 75 running over the second pair of finishing rolls for absorbing the excess moisture which is brought to the surface of the paste at this time. These belts may either be of canvas or of some heavy, highly absorbent paper material. They are run over idler sprockets 76 and maintained under tension by springs 77.

It will be evident that the method of applying the paste which consists in first simultaneously applying a generous quantity to both sides of the grid plate while the plate is in upright position, and then successively removing the excess, packing the paste down and drying the paste, may be carried out by other machines than that illustrated.

It will also be evident that a great many changes and alterations might be made in the parts described without departing from the invention.

I claim:

1. Apparatus for applying paste to battery grids including a bed along which the grids are slid in vertical position, said bed including a guide track for the grids, a pair of paste discharging nozzles on opposite sides of the track to force paste against opposite sides of the grids as the latter pass between the nozzles, a series of pairs of adjustably spring-tensioned finishing rolls acting successively on the grids after they have passed the nozzles to transfer them along the track, compact and smooth the paste and remove the excess.

2. Apparatus as set forth in claim 1 and wherein canvas belts associated with one pair of finishing rolls act to absorb the moisture brought to the surface of the paste by the compacting operation.

RAGNAR J. RIXDORFF.